United States Patent
Mendiratta et al.

(10) Patent No.: US 8,112,512 B2
(45) Date of Patent: Feb. 7, 2012

(54) METHOD AND SYSTEM FOR DYNAMIC PLUGGING OF VARBINDS

(75) Inventors: Rohit Mendiratta, Bangalore (IN); Kiran Koushik AS, Bangalore (IN); Narayana Pai, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 986 days.

(21) Appl. No.: 11/138,125

(22) Filed: May 26, 2005

(65) Prior Publication Data
US 2006/0271657 A1    Nov. 30, 2006

(51) Int. Cl.
*G06F 15/173* (2006.01)
*G06F 15/177* (2006.01)

(52) U.S. Cl. .................. 709/224; 709/220; 709/223

(58) Field of Classification Search .......... 709/223–226; 370/252
See application file for complete search history.

(56) References Cited

U.S. PATENT DOCUMENTS

| | | | | |
|---|---|---|---|---|
| 5,930,476 A | * | 7/1999 | Yamunachari et al. | 709/224 |
| 5,987,514 A | * | 11/1999 | Rangarajan | 709/224 |
| 6,167,403 A | * | 12/2000 | Whitmire et al. | 707/10 |
| 6,633,909 B1 | | 10/2003 | Barrett | |
| 6,854,011 B2 | | 2/2005 | Kim | |

OTHER PUBLICATIONS

Case et al., RFC 1157, A Simple Network Management Protocol (SNMP), May 1990, http://www.iettorg/rfc/rfc1157.txt.*

* cited by examiner

*Primary Examiner* — Yemane Mesfin
*Assistant Examiner* — Carlos Perez
(74) *Attorney, Agent, or Firm* — Fish & Richardson P.C.

(57) ABSTRACT

A method and system for plugging varbinds in a Simple Network Management Protocol (SNMP) notification is provided. The SNMP notification for an event is sent to customers involved with the event. A pre-defined varbind list is associated with the SNMP notification. The pre-defined varbind list provides the customers with details of the event. The customer analyzes the event with the information in the varbinds, and sends a request for additional varbinds for further analysis of the event. The additional varbinds are configured in the pre-defined varbind list at run time.

9 Claims, 3 Drawing Sheets

METHOD AND SYSTEM FOR DYNAMIC PLUGGING OF VARBINDS

BACKGROUND OF THE INVENTION

1. Field of Invention

Embodiments of the present invention relate in general to the field of network management. More specifically, the embodiments of the present invention relate to methods and systems for plugging varbinds in a Simple Network Management Protocol (SNMP) notification.

2. Description of the Background Art

A Simple Network Management Protocol (SNMP) is an application layer protocol, which facilitates exchange of management information between network components such as servers, switches, routers and workstations in a network.

The information exchanged between the network components provides details of an event occurring in the network. The event is defined as an action occurring in the network. An exemplary event can be a link down of a communication link in the network. The link down indicates failure of the communication link between two network components. The SNMP protocol generates a SNMP notification for the event. The SNMP notification is sent to the customers, i.e., users of the network components involved with the event. The SNMP notification is associated with a pre-defined varbind list. The pre-defined varbind list includes one or more varbinds, which provide details of the event to the customers.

A varbind comprises name of a variable corresponding to an event and the value of the variable. A pre-defined varbind list comprises a list of names of variables corresponding to the event in a network and values of the variables. The values of the variables in the pre-defined varbind list provide information about the event occurring in the network. However, in some cases, a customer requires additional details about the event. Therefore, the additional varbinds need to be configured to the pre-defined varbind list associated with the SNMP notification of the event.

Various methods and systems exist for configuring the additional varbinds. One such method is the Network Monitoring System (NMS). In NMS, polling is carried out among the customers in the network to obtain the required varbinds after getting a request for the additional varbinds from one or more customers. The required varbinds are then configured in the pre-defined varbind lists. The configured list is made available to all the customers. However, the polling in NMS results in extra usage of bandwidth of the communication channel or Internet, which, in turn, reduces the speed of information exchange between the network components. Further, the polling leads to congestion in the network.

Another method of configuring additional varbinds is upgrading the version of an operating system of a network component. However, this method of configuring additional varbinds is not specific to the customers. Each customer using the upgraded version of the operating system receives the additional varbinds configured in the predefined varbind lists. Further, this method is not cost efficient, as every time a customer requires an additional varbind, the customer has to upgrade the version of the operating system.

DETAILED DESCRIPTION OF EMBODIMENTS OF THE INVENTION

Various embodiments of the present invention provide methods, systems and machine-readable media for plugging varbinds in a Simple Network Management Protocol (SNMP) notification.

In an embodiment, the present invention provides a method for plugging varbinds in a SNMP notification. A pre-defined varbind list associated with the SNMP notification of an event is provided to a customer. The customer analyses the event with the help of the information provided by varbinds in the pre-defined varbind list. The customer makes a request for one or more additional varbinds. The one or more additional varbinds are then configured in the pre-defined varbind list. The configuration is performed at run time. The pre-defined varbind list, with the one or more additional varbinds, is provided to the customer.

In an embodiment, the present invention provides a system for plugging varbinds in a SNMP notification. The system includes a pre-defined varbind list associated with the SNMP notification of an event, a SNMP agent, and a receiving module. The pre-defined varbind list is provided to customers involved with the event. The receiving module receives a request for one or more additional varbinds from the customers. The SNMP agent then configures one or more additional varbinds in the pre-defined varbind list at run time.

Figure 1:
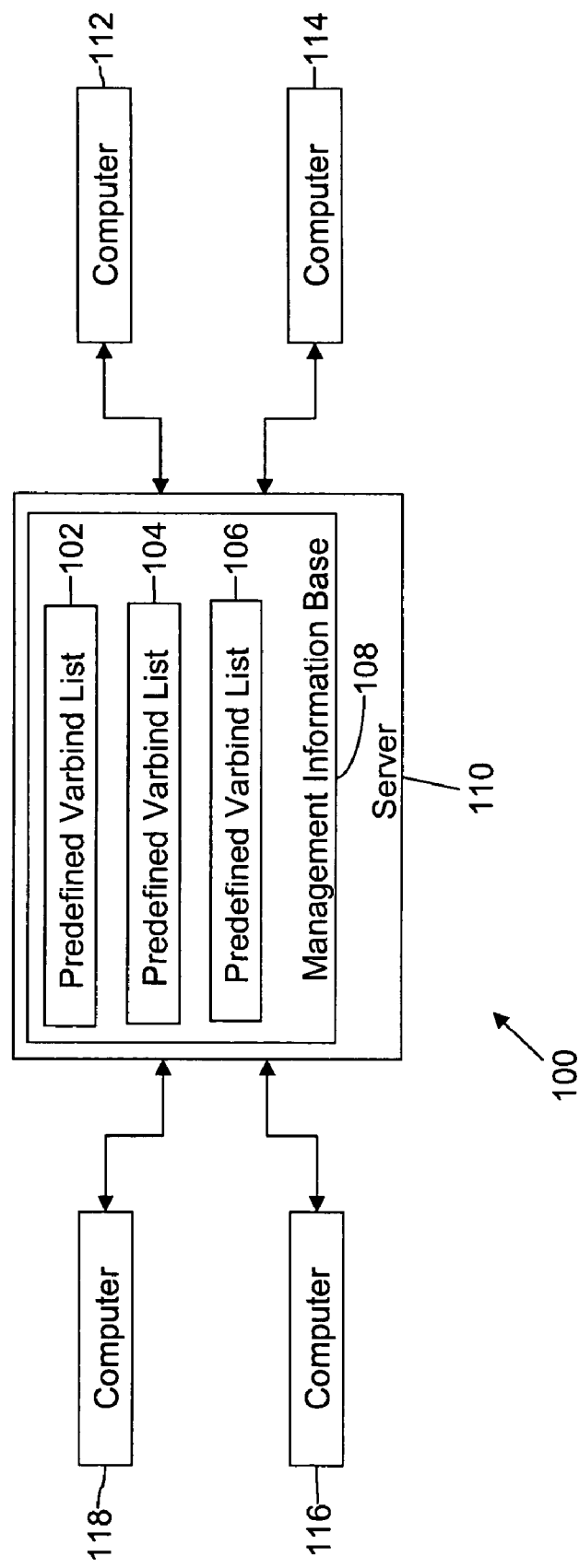
FIG. 1 illustrates a network in which an embodiment of the present invention can be practiced.

FIG. 1 illustrates a network 100 in which an exemplary embodiment of the present invention can be practiced. Examples of network 100 include a local area network, a wide area network, and so forth. In one embodiment of the present invention, network 100 is the Internet. Network 100 includes a plurality of computers, hereinafter referred to as computers 112, 114, 116 and 118, and a server 110. Examples of a computer include, but are not limited to, general-purpose computers, computing devices and laptops. Server 110 includes a management information base (MIB) 108. MIB 108 includes a plurality of pre-defined varbind lists, hereinafter referred to as pre-defined varbind lists 102, 104 and 106. Network management information is exchanged over communication channels between computers 112, 114, 116 and 118 via server 110.

MIB 108 is a database that stores and maintains information about events occurring in network 100. An event in a network is defined as an action occurring in the network. An exemplary event can be a link down of a communication link. The link down specifies failure of the communication link between two network components in the network. Further, MIB 108 also stores information such as the IP address of computers 112, 114, 116 and 118, the IP address of server 110, the operational state of computers 112, 114, 116 and 118, and the operational state of server 110.

The information in MIB 108 is stored in the form of pre-defined varbind lists. In one embodiment of the present invention, varbinds of a pre-defined varbind list are stored in one table. In another embodiment of the present invention, varbinds of a pre-defined varbind list are stored in more than one table in MIB 108. In another embodiment of the present invention, varbinds are stored in a tree structure.

A varbind comprises name of a variable corresponding to an event and the value of the variable. The variable is defined, using parameters such as an object identifier, a data type of the variable, and a data value. The object identifier identifies the variable corresponding to the event. The data types of the variable provide details about the type of data in the varbind, such as an integer, an octal number, a binary number, and a character. The data value represents the value of the event, for example, a value representing status of the operational state of an interface. For example, the ifOperStatus varbind provides information about the operational state of computer 112. The object identifier for the ifOperStatus varbind identifies the variable providing status of computer 112. The data type of ifOperStatus varbind is an integer. The data value of the ifOperStatus varbind provides details about the status of the computer. For example, a data value of one implies that computer 112 is in an activated state, and a data value of two implies that computer 112 is in a de-activated state.

A network management protocol, such as the Simple Network Management Protocol (SNMP), uses and maintains the information stored in MIB 108 for monitoring the functions of network 100. SNMP is an application layer protocol that facilitates exchange of information between computers 112, 114, 116 and 118 via server 110. A SNMP notification is send to computer 112 for an event. The SNMP notification is associated with pre-defined varbind list 104. The varbinds in the predefined varbind list provide details of the event to computer 112.

Figure 2:
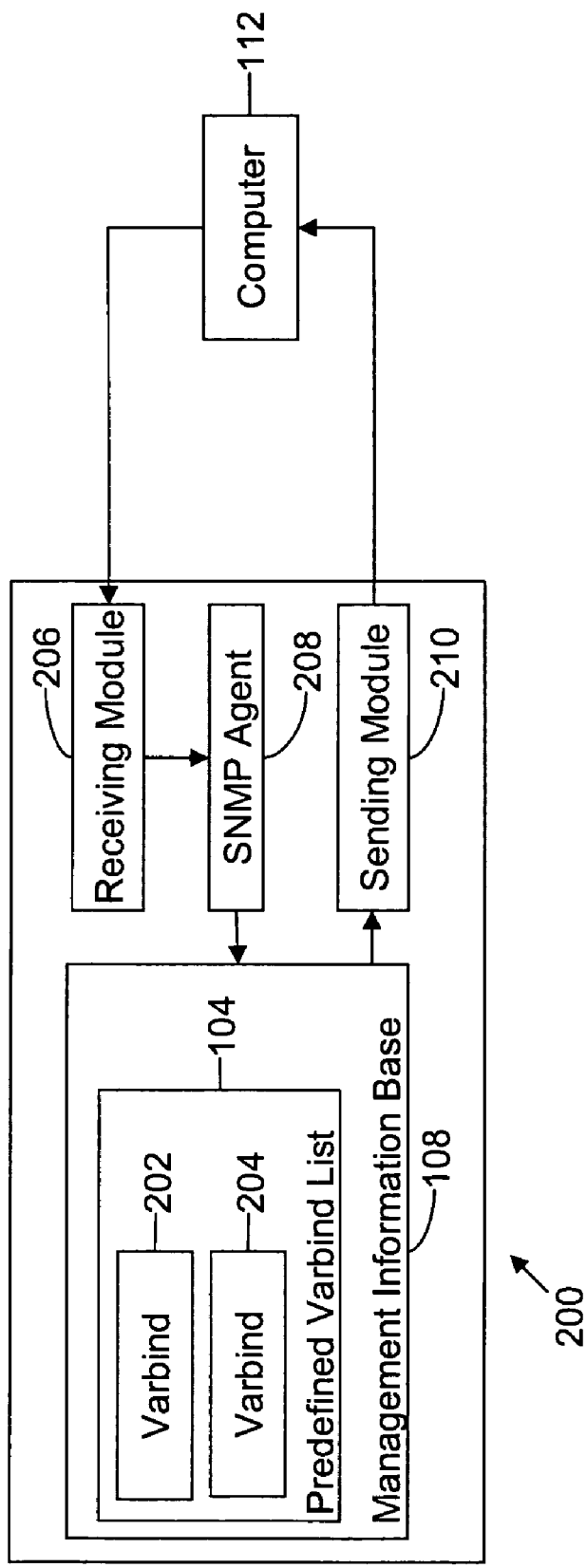
FIG. 2 is a block diagram of a system for plugging varbinds in a Simple Management Network Protocol (SNMP) notification, in accordance with an embodiment of the present invention.

FIG. 2 is a block diagram of a system 200 for plugging varbinds in a SNMP notification, in accordance with an embodiment of the present invention. System 200 includes MIB 108, a receiving module 206, an SNMP agent 208, and a sending module 210. MIB 108 includes pre-defined varbind list 104. Pre-defined varbind list 104 includes a plurality of varbinds, hereinafter referred to as varbinds 202 and 204.

Sending module 210 sends a SNMP notification pertaining to an event to computer 112. The SNMP notification is associated with pre-defined varbind list 104. Computer 112 analyzes the event with the information provided by varbinds 202 and 204 in pre-defined varbind list 104. A customer, using computer 112, sends a request for one or more additional varbinds for further analyses of the event.

Receiving module 206 receives the request and activates SNMP agent 208. SNMP agent 208 configures the one or more additional varbinds to pre-defined varbind list 104 at run time. Pre-defined varbind list 104 is updated with one or more additional varbinds. Sending module 210 then sends an SNMP notification with the one or more additional varbinds, configured in pre-defined varbind list 104, to computer 112.

In various embodiments of the present invention, system elements such as receiving module 206, SNMP agent 208, sending module 210, and MIB 108 are implemented as software or hardware modules, or a combination thereof.

Figure 3:
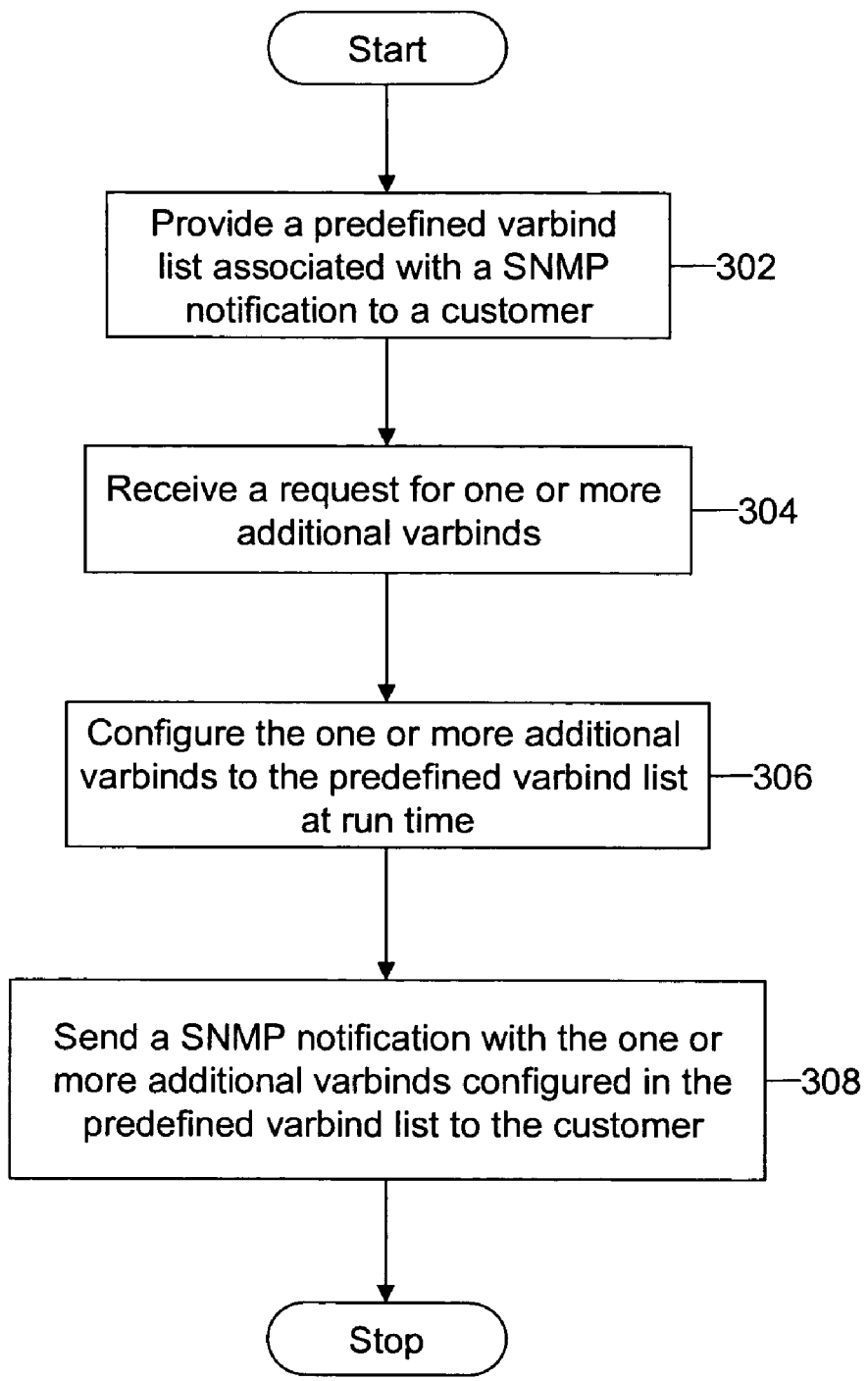
FIG. 3 is a flowchart illustrating a method for plugging varbinds in a Simple Management Network Protocol (SNMP) notification, in accordance with an embodiment of the present invention.

FIG. 3 is a flowchart illustrating a method for plugging varbinds in a SNMP notification, in accordance with an embodiment of the present invention.

At step 302, a SNMP notification for an event is sent to computers in a network. For example, in the event of failure of an interface between two computers, an SNMP notification is sent to the two failed computers. The SNMP notification pertaining to the failure of the interface is associated with a pre-defined varbind list, which includes three varbinds ifIndex, ifAdminStatus and ifOperStatus.

Customers using the two computers analyze the event with the information provided by the three varbinds in the pre-defined varbind list. The ifIndex varbind provides an index of the interface that specifies the interface that has failed. The ifAdminStatus varbind provides the information about readiness for operation of the interface. The ifOperStatus varbind provides the customers a current operational state of the interface.

Customers may require additional information about the event. Therefore, at step 304, the customer requiring the additional information sends a request for one or more additional varbinds for further analysis of the event. The request is given by using a command line interface or SNMP. The request provides an object identifier of the SNMP notification, object identifiers of the one or more additional varbinds and the IP address of the computer that has requested for the one or more additional varbind. For example, in the event of the failure of the interface between the two computers, customers using the two computers may require additional information about the version of the interface hardware or software. Therefore, a customer sends a request for the additional varbind ifDescr.

At step 306, the one or more additional varbinds are configured in the pre-defined varbind list at run time. The object identifiers of the one or more additional varbinds are retrieved by using the command line interface or SNMP notification. The retrieved object identifiers are then configured with the object identifier of the SNMP notification. For the above example, the ifDescr varbind is configured in the pre-defined varbind list.

In one embodiment of the present invention, one or more additional varbinds are added at the end in the pre-defined varbind list. For example, in the event of the interface failure, the ifDescr varbind is added at the end of the ifOperStatus varbind in the pre-defined varbind list.

Thereafter, at step 308, an SNMP notification is sent to the computer, with one or more additional varbinds configured in the pre-defined varbind. For example, in the event of the failure of the interface, an SNMP notification is sent to the two computers with the ifDescr varbind configured in the pre-defined varbind list.

In one embodiment of the present invention, one or more varbinds are configured in the pre-defined varbind list specific to the customers. Further, the customers requesting the additional varbinds receive one or more varbinds with an SNMP notification of an event. Other customers in the network may not receive these additional varbinds with the SNMP notification of the event.

Embodiments of the present invention have the advantage that the varbinds can be configured at run time. Further, the varbinds can be configured specific to the customers. Therefore, other customers in the network are not affected. Moreover, customers need not upgrade the version of the operating system to receive the additional varbinds and polling is also not required.

Although the invention has been discussed with respect to specific embodiments thereof, these embodiments are merely illustrative, and not restrictive, of the invention. For example, a 'method for plugging varbinds in a SNMP notification' can include any type of analysis, manual or automatic, to anticipate the needs of the method.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain and store the computer program for use by or in connection with the instruction execution system apparatus, system or device. The computer readable medium can be, by way of example only but not by limitation, a semiconductor system, apparatus, system, device, or computer memory. The computer readable medium may have suitable instructions for synchronously presenting multiple video program ID streams, such as on a display screen, or for providing for input or presenting in accordance with various embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims

What is claimed is:

1. A method comprising
sending a simple network management protocol (SNMP) notification in response to an event, the notification including a pre-defined varbind list, wherein each varbind in the pre-defined varbind list comprises a variable corresponding to a managed object instance and a value of the variable and provides information on the event associated with the SNMP notification;
receiving, in response to the SNMP notification, a request to add one or more additional varbinds to the pre-defined varbind list of the notification, wherein the request provides an object identifier of the SNMP notification, one or more object identifiers of the one or more additional varbinds, and an Internet protocol (IP) address of a computer that generated the request;
storing the object identifiers of the one or more additional varbinds and the IP address of the computer that generated the request with the object identifier of the SNMP notification,
retrieving, in response to the next occurrence of the event and using the one or more object identifiers of the one or more additional varbinds stored with the object identifier of the SNMP notification, the one or more additional varbinds;
configuring the one or more additional varbinds at run time, by mapping the one or more additional varbinds to the object identifier of the SNMP notification based on a specified requirement of one or more customers receiving the pre-defined varbind list; and
sending a new SNMP notification to the IP address stored with the object identifier of the SNMP notification, the new SNMP notification being configured separately for each customer with the one or more additional varbinds configured in the pre-defined varbind list based on the specified requirement of the one or more customers.

2. The method according to claim 1 wherein a varbind provides an index of an interface between two computers that specifies that the interface has failed.

3. A computer-implemented system comprising:
a processor;
a sending module for sending a simple network management protocol (SNMP) notification in response to an event, the notification including a pre-defined varbind list, wherein each varbind in the pre-defined varbind list comprises a variable corresponding to a managed object instance and a value of the variable and provides information on the event associated with the SNMP notification;
a receiving module for receiving, in response to the SNMP notification, a request to add one or more additional varbinds to the pre-defined varbind list of the notification, wherein the request provides an object identifier of the SNMP notification, one or more object identifiers of one or more additional varbinds, and an Internet protocol (IP) address of a computer that generated the request;
a storage module for storing the object identifiers of the one or more additional varbinds and the IP address of the computer that generated the request with the object identifier of the SNMP notification,
an SNMP agent for retrieving, in response to the next occurrence of the event and using the one or more object identifiers of the one or more additional varbinds stored with the object identifier of the SNMP notification, the one or more additional varbinds and for configuring the one or more additional varbinds at run time by mapping the one or more additional varbinds to the object identifier of the SNMP notification based on a specified requirement of one or more customers receiving the pre-defined varbind list; and
an SNMP agent for sending a new SNMP notification to the IP address stored with the object identifier of the SNMP notification, the new SNMP notification being configured separately for each customer with the one or more additional varbinds configured in the pre-defined varbind list based on the specified requirement of the one or more customers.

4. A computer-implemented system comprising:
a processor;
means for sending a simple network management protocol (SNMP) notification in response to an event, the notification including a pre-defined varbind list, wherein each varbind in the pre-defined varbind list comprises a variable corresponding to a managed object instance and a value of the variable and provides information on the event associated with the SNMP notification;
means for receiving, in response to the SNMP notification, a request to add one or more additional varbinds to the pre-defined varbind list of the notification, wherein the request provides an object identifier of the SNMP notification, one or more object identifiers of the one or more additional varbinds, and an Internet protocol (IP) address of a computer that generated the request;
means for storing the object identifiers of the one or more additional varbinds and the IP address of the computer that generated the request with the object identifier of the SNMP notification,
means for retrieving, in response to the next occurrence of the event and using the one or more object identifiers of the one or more additional varbinds stored with the object identifier of the SNMP notification, the one or more additional varbinds;
means for configuring the one or more additional varbinds at run time, by mapping the one or more additional varbinds to the object identifier of the SNMP notification based on a specified requirement of one or more customers receiving the pre-defined varbind list; and
means for sending a new SNMP notification to the IP address stored with the object identifier of the SNMP notification, the new SNMP notification being configured separately for each customer with the one or more additional varbinds configured in the pre-defined varbind list based on the specified requirement of the one or more customers.

5. An apparatus comprising:

a processing system including a processor coupled to a display and user input device;

a machine-readable storage medium including instructions executable by the processor comprising:

one or more instructions for sending a simple network management protocol (SNMP) notification in response to an event, the notification including a pre-defined varbind list, wherein each varbind in the pre-defined varbind list comprises a variable corresponding to a managed object instance and a value of the variable and provides information on the event associated with the SNMP notification;

one or more instructions for receiving, in response to the SNMP notification, a request to add one or more additional varbinds to the pre-defined varbind list of the notification, wherein the request provides an object identifier of the SNMP notification, one or more object identifiers of the one or more additional varbinds, and an Internet protocol (IP) address of a computer that generated the request;

one or more instructions for storing the object identifiers of the one or more additional varbinds and the IP address of the computer that generated the request with the object identifier of the SNMP notification, one or more instructions for retrieving, in response to the next occurrence of the event and using the one or more object identifiers of the one or more additional varbinds stored with the object identifier of the SNMP notification, the one or more additional varbinds;

one or more instructions for configuring the one or more additional varbinds at run time, by mapping the one or more additional varbinds to the object identifier of the SNMP notification based on a specified requirement of one or more customers receiving the pre-defined varbind list; and one or more instructions for sending a new SNMP notification to the IP address stored with the object identifier of the SNMP notification, the new SNMP notification being configured separately for each customer with the one or more additional varbinds configured in the pre-defined varbind list based on the specified requirement of the one or more customers.

6. The method according to claim 1 wherein a data type of a variable provides details about data in the varbind associated with the variable.

7. The method according to claim 1 wherein a data type of a variable identifies data in the varbind associated with the variable as being one of an integer, an octal number, a binary number, and a character.

8. The method according to claim 1 wherein a data value of a variable represents a value associated with the event.

9. The method according to claim 1 wherein the one or more varbinds are configured in the pre-defined varbind list specific to each customer.

* * * * *